(12) United States Patent
Kang (10) Patent No.: US 11,230,248 B2
(45) Date of Patent: Jan. 25, 2022

(54) KNEE AIRBAG APPARATUS

(71) Applicant: HYUNDAI MOBIS CO., LTD., Seoul (KR)

(72) Inventor: I Seul Kang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 72 days.

(21) Appl. No.: 16/775,714

(22) Filed: Jan. 29, 2020

(65) Prior Publication Data

US 2020/0238938 A1    Jul. 30, 2020

(30) Foreign Application Priority Data

Jan. 30, 2019  (KR) .......................... 10-2019-0011757

(51) Int. Cl.
| | | |
|---|---|---|
| *B60R 21/215* | (2011.01) | |
| *B60R 21/206* | (2011.01) | |
| *B60R 21/237* | (2006.01) | |
| *B60R 21/2165* | (2011.01) | |
| *B60R 21/00* | (2006.01) | |
| *B60R 21/2342* | (2011.01) | |
| *B60R 21/2338* | (2011.01) | |
| *B60R 21/231* | (2011.01) | |

(52) U.S. Cl.
CPC ........ *B60R 21/206* (2013.01); *B60R 21/2165* (2013.01); *B60R 21/237* (2013.01); *B60R 21/2338* (2013.01); *B60R 21/2342* (2013.01); *B60R 2021/0051* (2013.01); *B60R 2021/21518* (2013.01); *B60R 2021/23169* (2013.01); *B60R 2021/23382* (2013.01)

(58) Field of Classification Search
CPC . B60R 21/206; B60R 21/2165; B60R 21/237; B60R 21/2338; B60R 21/2342; B60R 2021/0051; B60R 2021/21518; B60R 2021/23169; B60R 2021/23382
USPC ....................................................... 280/730.2
See application file for complete search history.

(56) References Cited

U.S. PATENT DOCUMENTS

| | | | | |
|---|---|---|---|---|
| 8,585,078 | B1 * | 11/2013 | Witt, Jr. ................. | B60R 21/207 280/728.3 |
| 10,093,265 | B2 * | 10/2018 | Ando ..................... | B60R 21/206 |
| 10,829,074 | B2 * | 11/2020 | Jacobson ............ | B60R 21/2338 |
| 2009/0152839 | A1 * | 6/2009 | Thomas ................ | B60R 21/215 280/728.2 |
| 2011/0193328 | A1 * | 8/2011 | Fukawatase .......... | B60R 21/201 280/730.2 |
| 2013/0015646 | A1 * | 1/2013 | Okamoto ............ | B60R 21/2171 280/743.1 |
| 2014/0375024 | A1 * | 12/2014 | Osterfeld ............ | B60R 21/2176 280/728.2 |
| 2016/0332591 | A1 * | 11/2016 | Schwark ............. | B60R 21/2165 |
| 2020/0148153 | A1 * | 5/2020 | Hioda ................... | B60R 21/215 |

* cited by examiner

*Primary Examiner* — Toan C To

(74) *Attorney, Agent, or Firm* — H.C. Park & Associates, PLC (57) ABSTRACT

A knee airbag apparatus including a housing part that is formed such that one side thereof is open, a cover part covering the open portion of the housing part, a cushion part that is accommodated in a folded state inside the housing part and connected to an inflator, and a flap part surrounding the folded cushion part on a side of the cover part, and blocking a gap between the housing part and a lower panel of a vehicle to substantially prevent the cushion part from being caught by the lower panel when the cushion part is deployed.

11 Claims, 13 Drawing Sheets

KNEE AIRBAG APPARATUS

CROSS-REFERENCE TO RELATED APPLICATION

This application claims priority from and the benefit of Korean Patent Application No. 10-2019-0011757, filed on Jan. 30, 2019 which is hereby incorporated by reference for all purposes as if fully set forth herein.

BACKGROUND

Field

Exemplary embodiments of the present invention relate to a knee airbag apparatus, and more particularly, to a knee airbag apparatus capable of substantially preventing a cushion part from being caught in a gap between a housing part and a lower panel or caught by the lower panel when the cushion part is deployed.

Discussion of the Background

In general, a vehicle is provided therein with a knee airbag that protects a lower body of a passenger. The knee airbag is disposed below a lower panel facing the knee of the passenger. A cushion part of the knee airbag is packaged in a folded state in a housing part and a cover part is installed to cover an opening of the housing part.

As gas is supplied to the cushion part, the cushion part is inflated and deployed. At this time, since a cover cutting line of the cover part is cut by inflation pressure of the cushion part, the cover part is opened while being rotated in the housing part. As the cover part is opened, the cushion part is deployed upward from the lower side of the lower panel.

However, in the related art, when the lower end of the lower panel is installed lower than the lower side of the housing part, the cushion part may be caught by or interfere with the lower end of the lower panel while being deployed. Therefore, the deployment direction of the cushion part may be distorted or the cushion part may be incompletely deployed.

Furthermore, when the lower end of the lower panel is installed at a position higher than the lower side of the housing part, the cushion part may be caught in a gap between the lower panel and the housing part while being deployed upward. Therefore, the cushion part may be deployed between the lower panel and the housing part.

The above information disclosed in this Background section is only for enhancement of understanding of the background of the invention and, therefore, it may contain information that does not constitute prior art.

SUMMARY

Exemplary embodiments of the present invention of the present invention provide a knee airbag apparatus capable of substantially preventing a cushion part from being caught in a gap between a housing part and a lower panel or being caught by the lower panel when the cushion part is deployed.

Additional features of the invention will be set forth in the description which follows, and in part will be apparent from the description, or may be learned by practice of the invention.

An exemplary embodiment of the present invention provides a knee airbag apparatus including: a housing part that is formed such that one side thereof is opened; a cover part that is installed to cover the opened portion of the housing part; a cushion part that is accommodated in a folded state inside the housing part and connected to an inflator; and a flap part that is installed to surround the folded cushion part on a side of the cover part, and blocks a gap between the housing part and a lower panel of a vehicle to substantially prevent the cushion part from being caught by the lower panel when the cushion part is deployed.

The flap part may be provided with a tear line that separates the flap part into a plurality of flap parts, and the tear line may be formed on the flap part to be biased in a direction away from the lower panel with respect to a center of the cover part.

The flap part may be provided with a tear line that separates the flap part into a plurality of flap parts, and the tear line may be formed on the flap part to be biased toward an opposite side in a deployment direction of the cushion part with respect to a center of the cover part.

One side of the flap part may be connected to the cushion part or a bracket part, and the other side of the flap part may be locked to a hook portion of the housing part.

The flap part may include: a flap body that is connected to the bracket part or the cushion part and installed to surround the folded cushion part; and a locking portion that extends from the other side of the flap body so as to be locked to the hook portion and is provided with the tear line.

The flap part may include: a first flap portion that is installed to surround the folded cushion part on the side of the cover part and provided with a tear line; and a second flap portion that is disposed to overlap the first flap portion.

The tear line may separate the first flap portion into a plurality of first flap portions, and be formed on the first flap portion to be biased in a direction closer to the lower panel with respect to a center of the cover part.

The tear line may separate the first flap portion into a plurality of first flap portions, and be formed on the first flap portion to be biased in a deployment direction of the cushion part with respect to a center of the cover part.

The first flap portion may have one side connected to the cushion part or the bracket part and the other side locked to the hook portion of the housing part, the second flap portion may be connected to the first flap portion by a first sewing part and a second sewing part, and the second sewing part may be torn when the cushion part is inflated.

The first sewing part may be formed at a point closer to the lower panel than the tear line, and the second sewing part may be formed at a point farther from the lower panel than the tear line.

The first flap portion may include: a first flap body that has one side connected to the cushion part or the bracket part and is provided with the tear line; and a first locking portion that extends from the other side of the first flap body so as to be locked to the hook portion.

The flap part may be flipped to cover the bracket part, an upper side of the cushion part may be folded in a zigzag manner, a lower side of the cushion part may be roll-folded, and both sides of the cushion part may be folded in a zigzag manner.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Hereinafter, a knee airbag apparatus in accordance with embodiments of the present invention will be described with reference to the accompanying drawings. In describing the knee airbag apparatus, it should be noted that the drawings are not to precise scale and may be exaggerated in thickness of lines or sizes of components for descriptive convenience and clarity only. Furthermore, the terms used herein are defined by taking functions of the disclosure into account and can be changed according to the custom or intention of users or operators. Therefore, definition of the terms should be made according to the overall disclosures set forth herein. This invention may, however, be embodied in many different forms and should not be construed as limited to the embodiments set forth herein. Rather, these embodiments are provided so that this disclosure is thorough, and will fully convey the scope of the invention to those skilled in the art.

Figure 1:
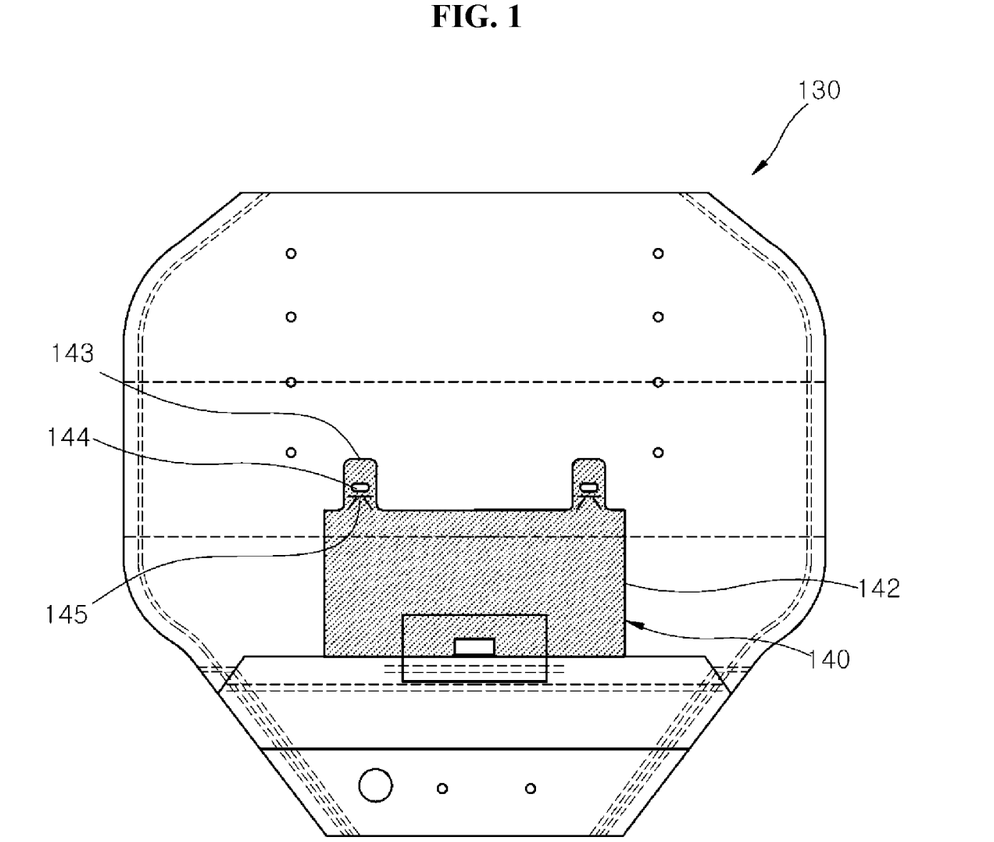
FIG. 1 is a plan view illustrating a state in which a cushion part and a flap part are unfolded in a knee airbag apparatus in accordance with a first exemplary embodiment of the present invention.
Figure 2:
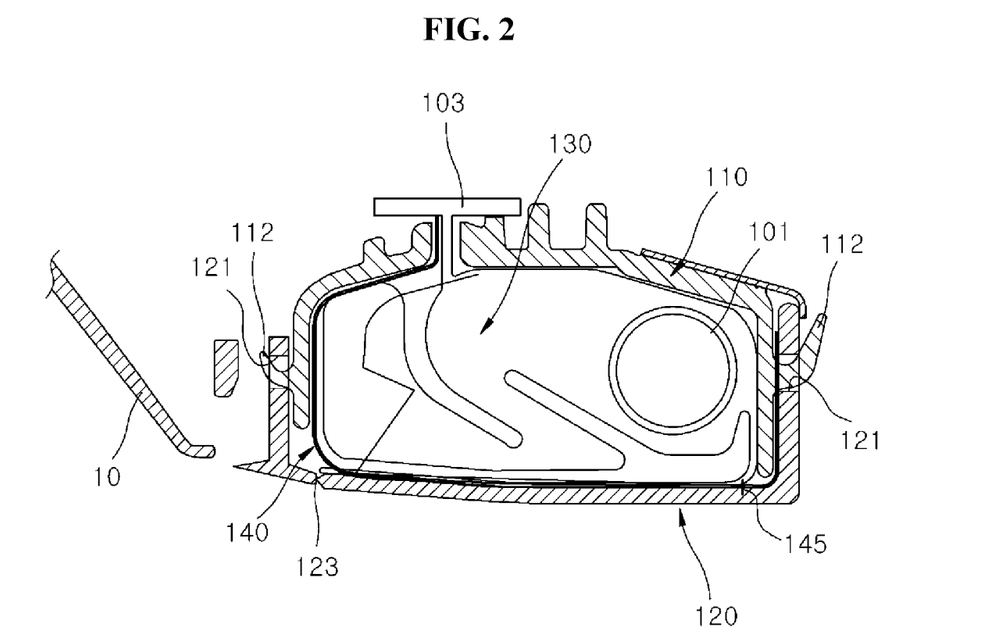
FIG. 2 is a sectional view illustrating the knee airbag apparatus in accordance with the first exemplary embodiment of the present invention.
Figure 3:
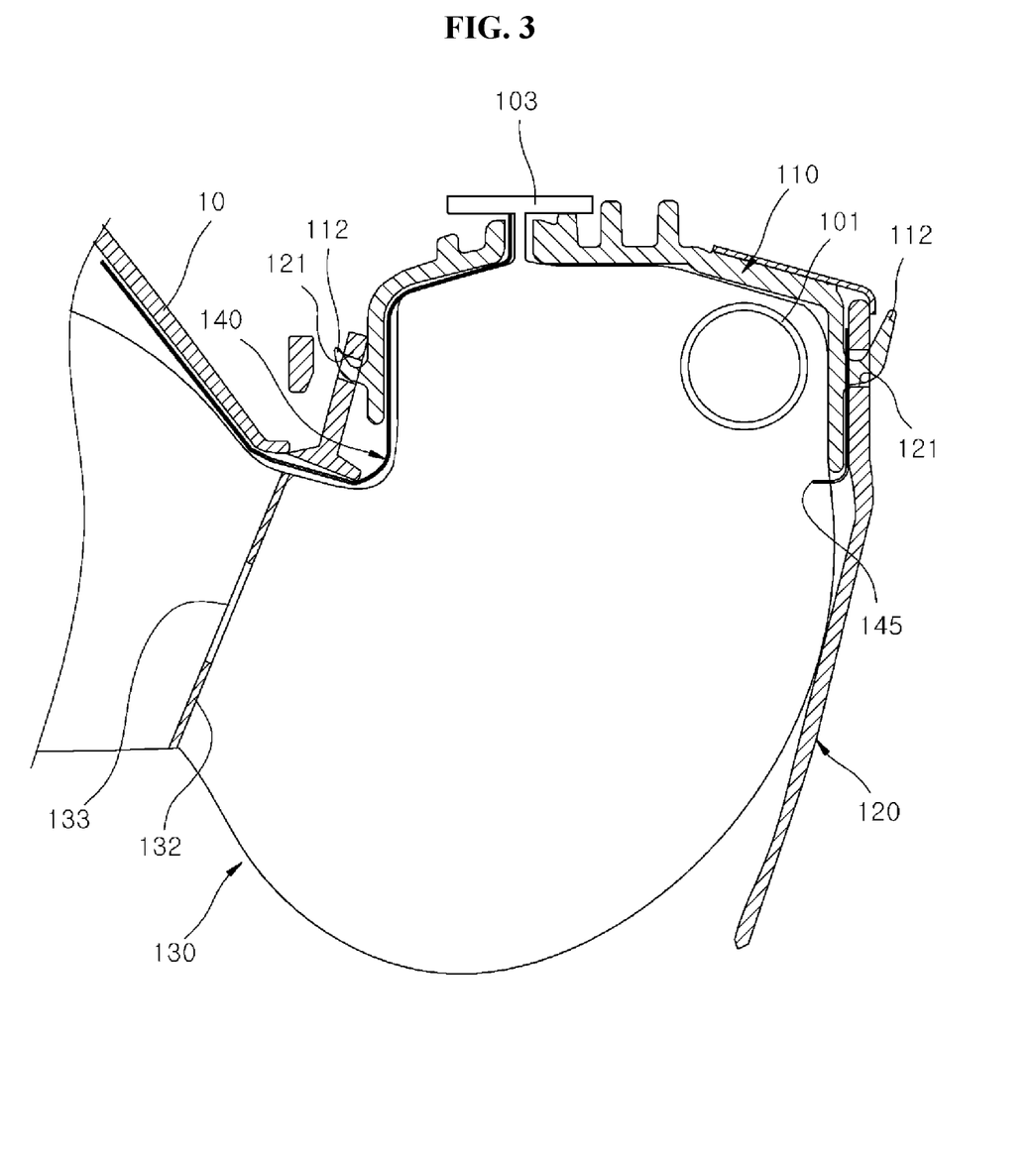
FIG. 3 is a sectional view illustrating a state in which the flap part blocks a gap between a lower panel and a housing part when the cushion part is deployed in the knee airbag apparatus in accordance with the first exemplary embodiment of the present invention.

FIG. 1 is a plan view illustrating a state in which a cushion part and a flap part are unfolded in a knee airbag apparatus in accordance with a first exemplary embodiment of the present invention. FIG. 2 is a sectional view illustrating the knee airbag apparatus in accordance with the first exemplary embodiment of the present invention. FIG. 3 is a sectional view illustrating a state in which the flap part blocks a gap between a lower panel and a housing part when the cushion part is deployed in the knee airbag apparatus in accordance with the first exemplary embodiment of the present invention.

Referring to FIG. 1 to FIG. 3, the knee airbag apparatus in accordance with the first exemplary embodiment of the present invention includes a housing part 110, a cover part 120, a cushion part 130, and a flap part 140.

The knee airbag apparatus is installed below a lower panel 10 of a vehicle, which is disposed in front of the knee of a passenger. The lower end of the lower panel 10 is disposed at substantially the same height as the lower end of the housing part 110. The housing part 110 is disposed at the front side of the lower panel 10.

The housing part 110 is formed such that one side thereof is opened. That is, the housing part 110 is formed to be opened downward and has an opening (not illustrated) at the lower side thereof. The housing part 110 may be formed in a rectangular box shape. The housing part 110 is provided at both sides thereof with hook portions 112.

The cover part 120 is installed to cover the opening of the housing part 110. The cover part 120 is formed at both sides thereof with hook holes 121 to be fitted to the hook portions 112 of the housing part 110. The cover part 120 is disposed below the housing part 110. The cover part 120 is formed at the inner space side thereof with a cover cutout part 123. The cover cutout part 123 is formed along the width direction of the vehicle. In the cover cutout part 123, a plurality of cutout holes (not illustrated) are arranged on a straight line.

The cushion part 130 is accommodated in a folded state inside the housing part 110 and connected to an inflator 101. As gas discharged from the inflator 101 is injected into the cushion part 130, the cushion part 130 is deployed. The cushion part 130 is deployed upward from the lower side of the lower panel 10 to cover the knee of the passenger.

An internal tether part 132 is connected to the inside of the cushion part 130 to limit an inflation thickness of the cushion part 130. A plurality of internal tether parts 132 may be disposed along the deployment direction of the cushion part 130. The internal tether part 132 is connected to the cushion part 130 by a tether sewing part (not illustrated). The internal tether part 132 is formed with a communication hole 133 through which gas may pass.

The flap part 140 is installed to surround the folded cushion part 130 on the side of the cover part 120, and blocks a gap between the housing part 110 and the lower panel 10 to substantially prevent the cushion part 130 from being caught by the lower panel 10 when the cushion part 130 is deployed.

The flap part 140 may be made of a fabric or substantially the same material as the cushion part 130. When the cushion part 130 is deployed, the flap part 140 is flipped and disposed between the housing part 110 and the lower panel 10 to block the gap between the housing part 110 and the lower panel 10, which makes it possible to substantially prevent the cushion part 130 from being caught by or interfering with the lower end of the lower panel 10, regardless of the height of the lower end of the lower panel 10.

Furthermore, the gap between the housing part 110 and the lower panel 10 is blocked by the flap part 140, which makes it possible to substantially prevent the cushion part 130 from being deployed inside the lower panel 10 (toward the front side of the vehicle).

The flap part 140 is provided with a tear line 145 on an opposite side (indoor side) in the deployment direction of the cushion part 130. The tear line 145 separates the flap part 140 into a plurality of flap parts 140.

The tear line 145 of the flap part 140 is formed to be biased in a direction away from the lower panel 10, that is, the right direction, with respect to the center of the cushion part 130 in FIG. 2. In other words, since the tear line 145 is formed to be biased toward the opposite side in the deployment direction of the cushion part 130, an opposite side of the flap part 140 in the deployment direction is separated when the cushion part 130 is deployed. At this time, since the flap part 140 is flipped in the deployment direction (indoor side) of the cushion part 130, the flap part 140 blocks the gap between the lower end of the lower panel 10 and the housing part 110.

Accordingly, it is possible to substantially prevent the cushion part 130 from being caught by or interfering with the lower end of the lower panel 10 when the cushion part 130 is deployed, and to substantially prevent the deployment direction of the cushion part 130 from being distorted or the cushion part 130 from being incompletely deployed. Furthermore, the cushion part 130 is substantially prevented from being deployed inside the lower panel 10, which makes it possible to ensure the safety of the passenger.

One side of the flap part 140 is connected to the cushion part 130 or a bracket part 103, and the other side of the flap part 140 is locked to the hook portion 112 of the housing part 110.

The tear line 145 is formed between one side and the other side of the flap part 140. After the cover cutoff part 123 of the cover part 120 is cut off, the tear line 145 of the flap part 140 is torn. When the tear line 145 of the flap part 140 is torn, a portion of the flap part 140 caught by the hook portion 112 is separated from the flap part 140.

The flap part 140 includes a flap body 142 and locking portions 143. The flap body 142 is connected to the bracket part 103 or the cushion part 130 and is installed to surround the folded cushion part 130. The locking portion 143 extends from the other side of the flap body 142 to be locked to the hook portion 112, and is provided with the tear line 145. A plurality of locking portions 143 are formed along the other side of the flap body 142.

The locking portion 143 is formed with a locking hole 144 into which the hook portion 112 is inserted. Such a locking portion 143 may be formed in various forms as long as it is locked to the hook portion 112. Since the tear line 145 is formed on the locking portion 143, the length of the tear line 145 is reduced. Accordingly, as the inflation pressure of the cushion part 130 is applied to the flap body 142, the tear line 145 may be easily torn.

A folding method of the knee airbag apparatus in accordance with the first exemplary embodiment of the present invention configured as described above will be described below.

FIG. 4A to FIG. 4G are plan views illustrating a process of folding the cushion part in the knee airbag apparatus in accordance with the first exemplary embodiment of the present invention.

Figure 4A:
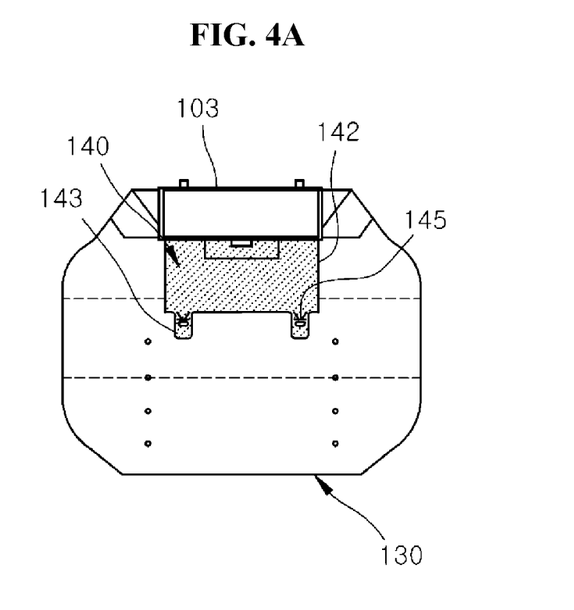
FIG. 4A, FIG. 4B, FIG. 4C, FIG. 4D, FIG. 4E, FIG. 4F, and FIG. 4G are plan views illustrating a process of folding the cushion part in the knee airbag apparatus in accordance with the first exemplary embodiment of the present invention.
Figure 4B:
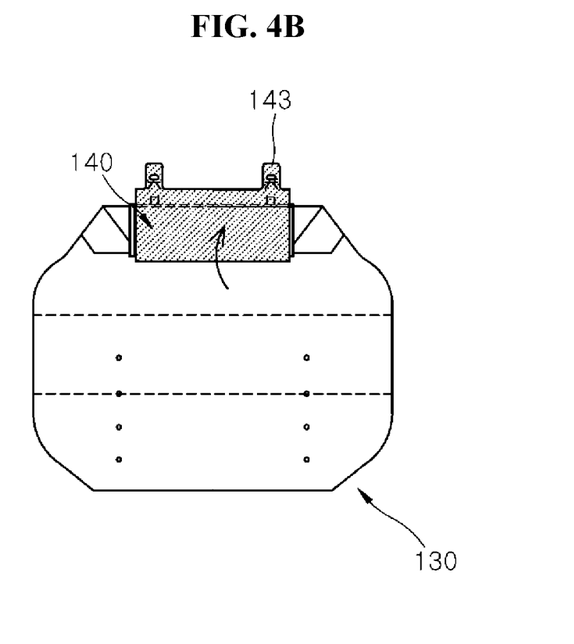
Figure 4C:
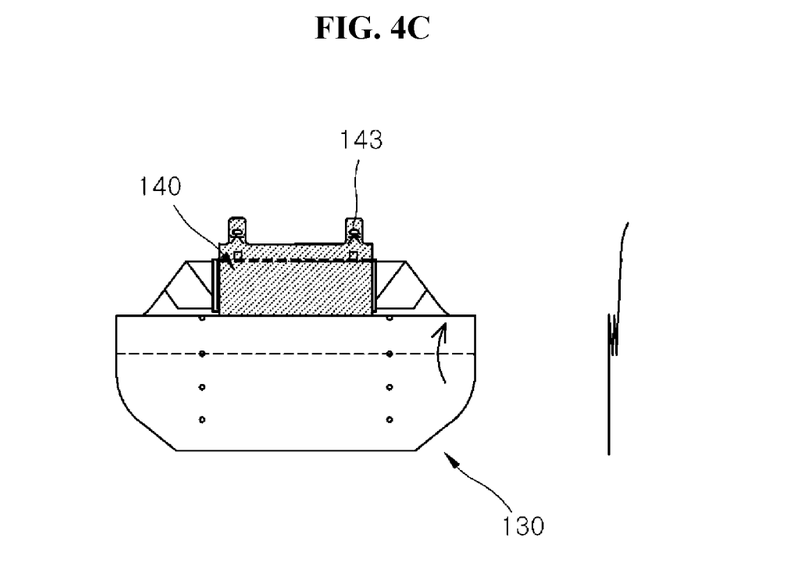

Referring to FIG. 4A to FIG. 4G, in a state in which the cushion part 130 is unfolded, the flap part 140 is flipped upward to cover the bracket part 103 (see FIG. 4A and FIG. 4B). The upper side of the cushion part 130 is folded a plurality of times in a zigzag manner (see FIG. 4C).

Figure 4D:
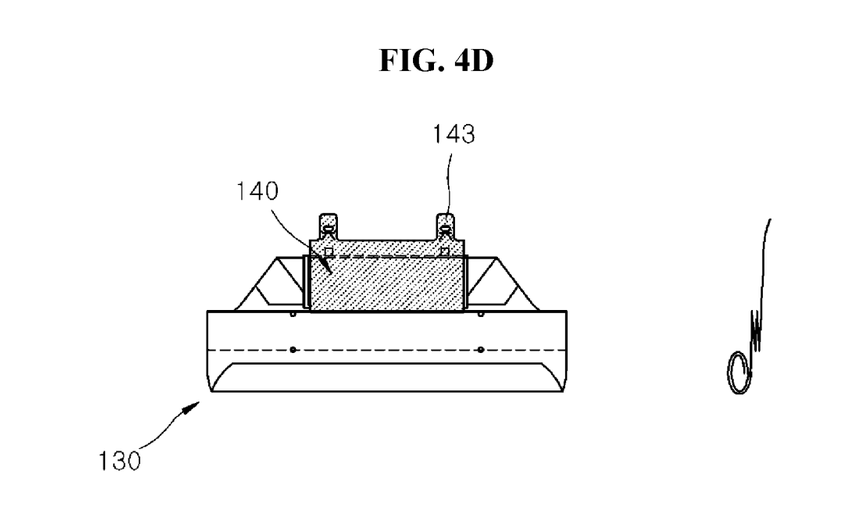
Figure 4E:
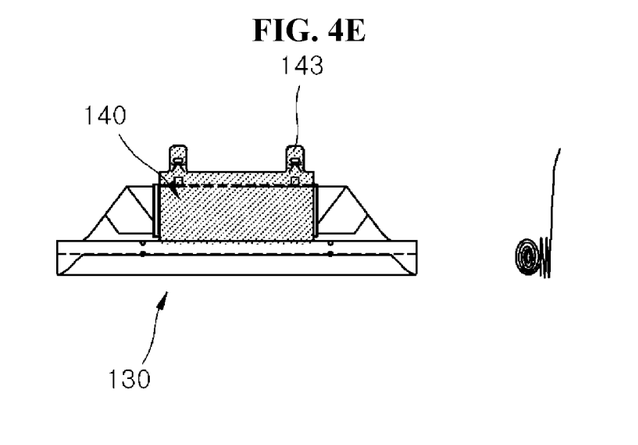

The lower side of the cushion part 130 is roll-folded (see FIG. 4D and FIG. 4E). The roll folding means that the lower side of the cushion part 130 is wound in one direction.

Figure 4F:
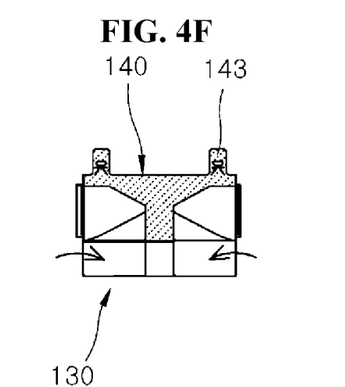

Both sides of the cushion part 130 are folded in a zigzag manner (see FIG. 4F). At this time, both sides of the zigzag-folded portion and the roll-folded portion are folded to the center side in a zigzag manner.

The flap part 140 is flipped downward to surround the lower side of the folded cushion part 130. At this time, the lower side (the side of the cover part 120) of the cushion part 130 is surrounded by the flap part 140. The folded cushion part 130 is packaged inside the housing part 110, and then the locking portions 143 of the flap part 140 are locked to the hook portions 112 of the housing part 110 (see FIG. 4G).

Figure 4G:
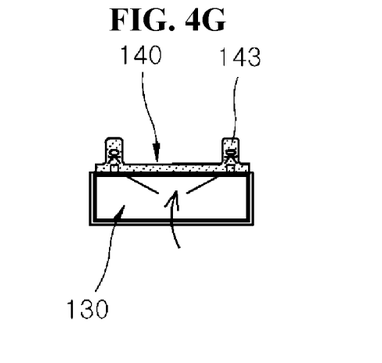

After the cushion part 130 is packaged in the housing part 110, the cover part 120 is assembled to the housing part 110. At this time, as the hook portions 112 of the housing part 110 are fastened to the hook holes 121 of the cover part 120, the cover part 120 is locked to the housing part 110. The cover cutoff part 123 of the cover part 120 is disposed on the lower panel 10 side (indoor side).

An operation of the knee airbag apparatus in accordance with the first exemplary embodiment of the present invention installed as described above will be described below.

Figure 5A:
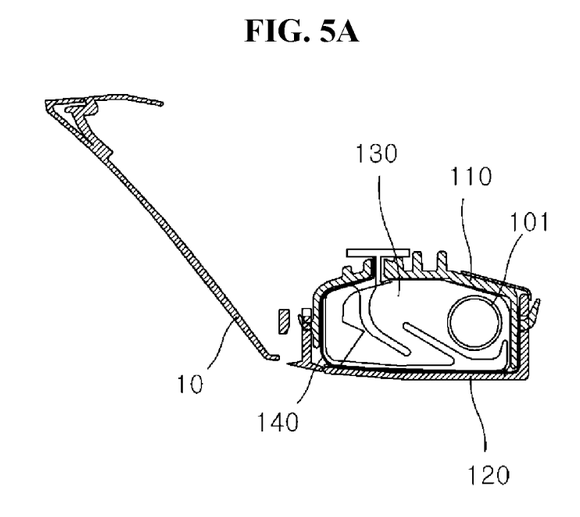
FIG. 5A, FIG. 5B, and FIG. 5C are views illustrating a process of deploying the cushion part in the knee airbag apparatus in accordance with the first exemplary embodiment of the present invention.
Figure 5B:
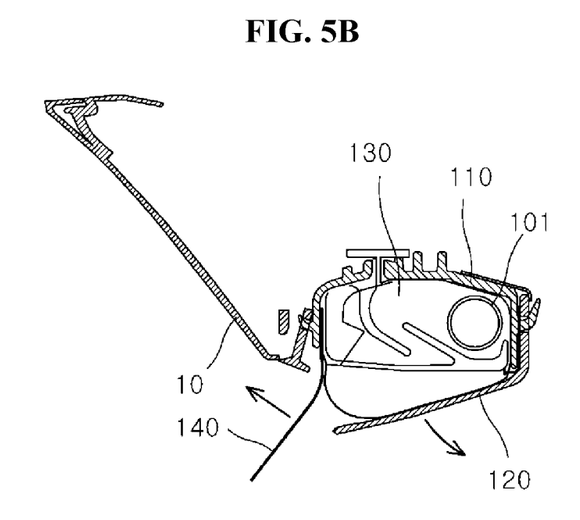
Figure 5C:
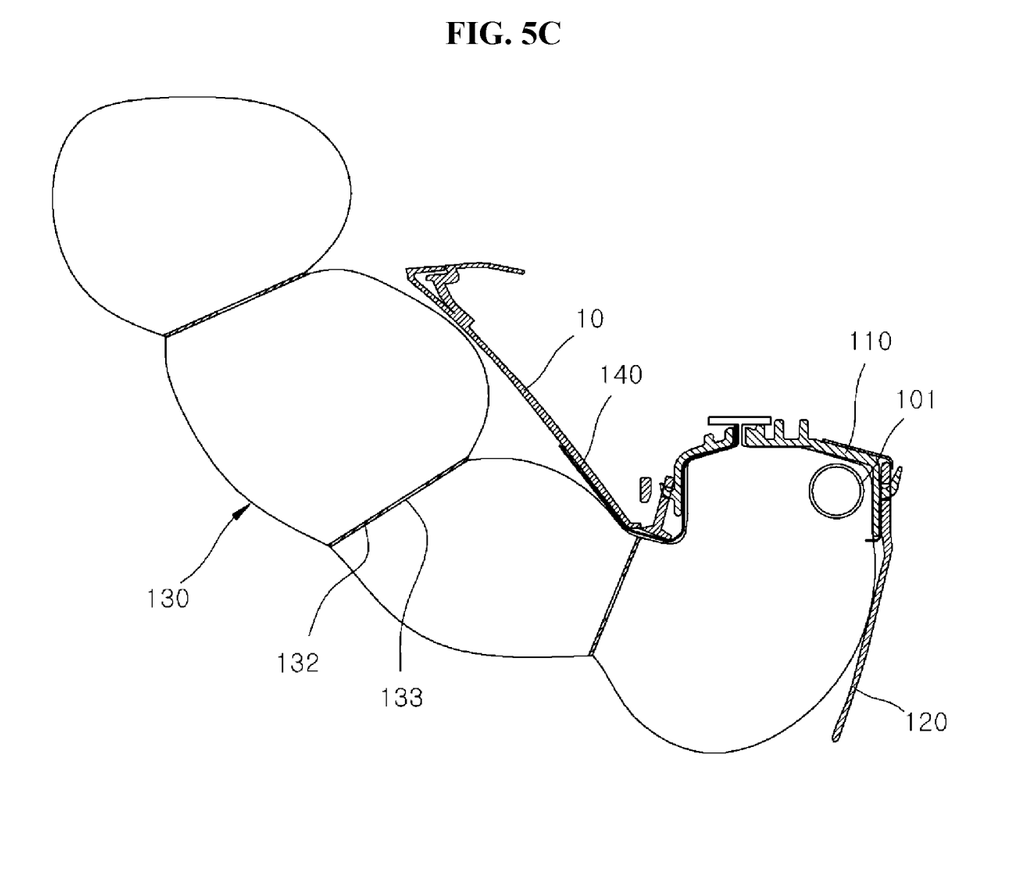

FIG. 5A to FIG. 5C are views illustrating a process of deploying the cushion part in the knee airbag apparatus in accordance with the first exemplary embodiment of the present invention.

Referring to FIG. 5A to FIG. 5C, when a collision of a vehicle is detected, the inflator 101 is driven. As gas generated in the inflator 101 is injected into the cushion part 130, the cushion part 130 is inflated. When the inflation pressure of the cushion part 130 is applied to the cover part 120, the cover cutoff part 123 of the cover part 120 is cut off, such that the cover part 120 is rotated toward the front side of the vehicle to open the lower side of the housing part 110.

Subsequently, when the inflation pressure of the cushion part 130 is applied to the flap part 140, the tear line 145 of the flap part 140 is torn by the inflation pressure of the cushion part 130. Since the tear line 145 is disposed on the other side (opposite side of the indoor space) of the flap part 140, the flap part 140 is flipped in the deployment direction of the cushion part 130 by the tearing of the tear line 145. When the cushion part 130 is deployed to the indoor space side, the flap part 140 blocks the gap between the lower end of the lower panel 10 and the housing part 110.

Accordingly, it is possible to substantially prevent the cushion part 130 from being caught by, or interfering with, the lower end of the lower panel 10 when the cushion part 130 is deployed, and to substantially prevent the deployment direction of the cushion part 130 from being distorted or the cushion part 130 from being only partially deployed. Furthermore, the cushion part 130 is substantially prevented from being deployed inside the lower panel 10, which makes it possible to ensure the safety of the passenger.

Next, a knee airbag apparatus in accordance with a second exemplary embodiment of the present disclosure will be described below. Since the second exemplary embodiment is substantially the same as the first exemplary embodiment except for the form of the flap part, the same reference numerals are given to the same components, and a description thereof will be omitted.

Figure 6:
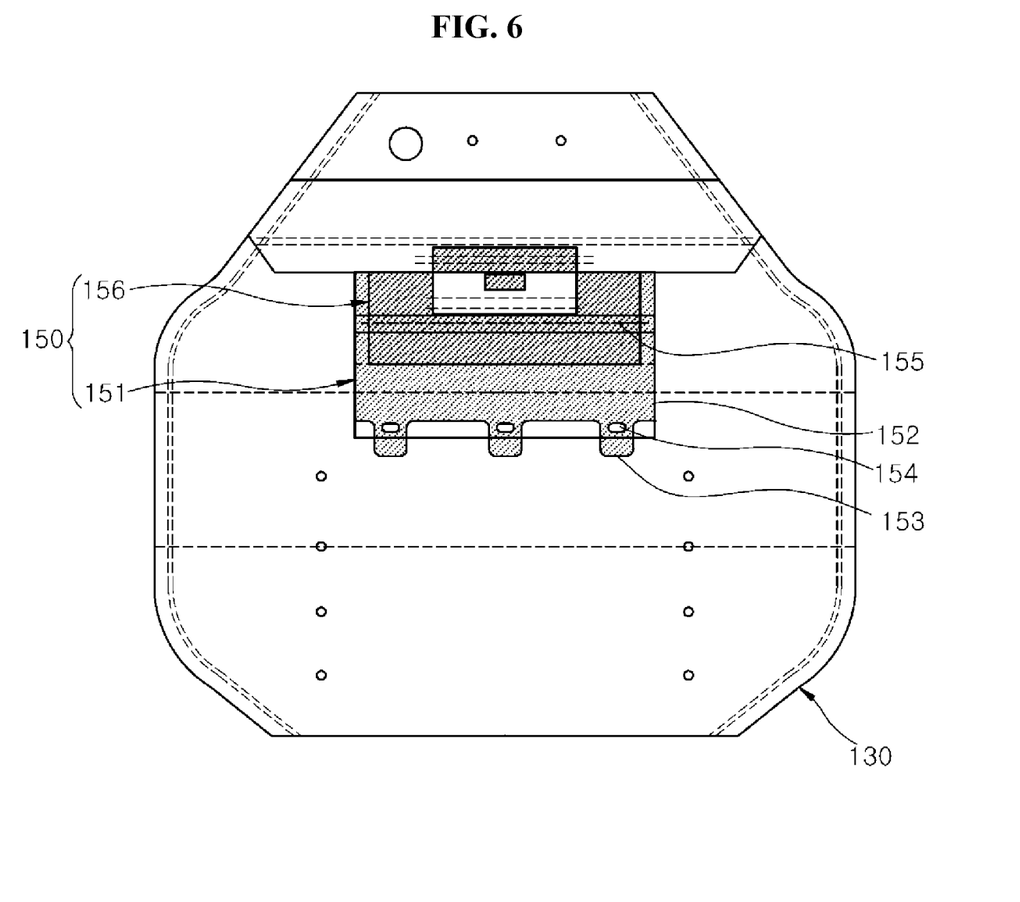
FIG. 6 is a plan view illustrating a state in which a cushion part and a flap part are unfolded in a knee airbag apparatus in accordance with a second exemplary embodiment of the present invention.
Figure 7:
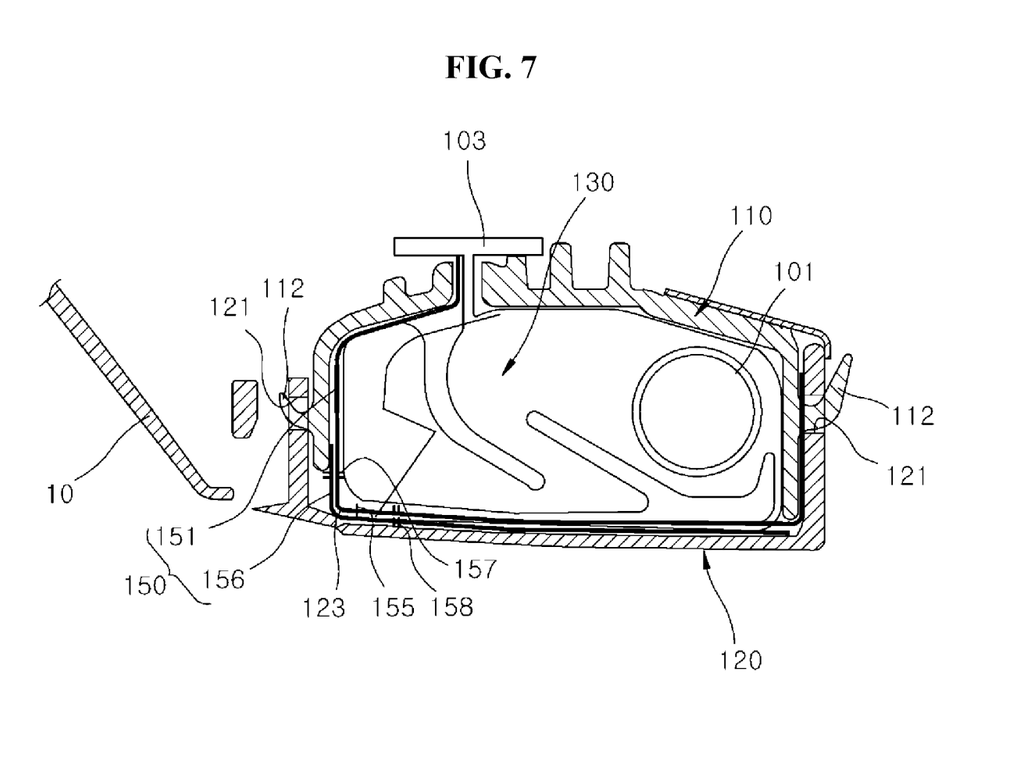
FIG. 7 is a sectional view illustrating the knee airbag apparatus in accordance with the second exemplary embodiment of the present invention.
Figure 8:
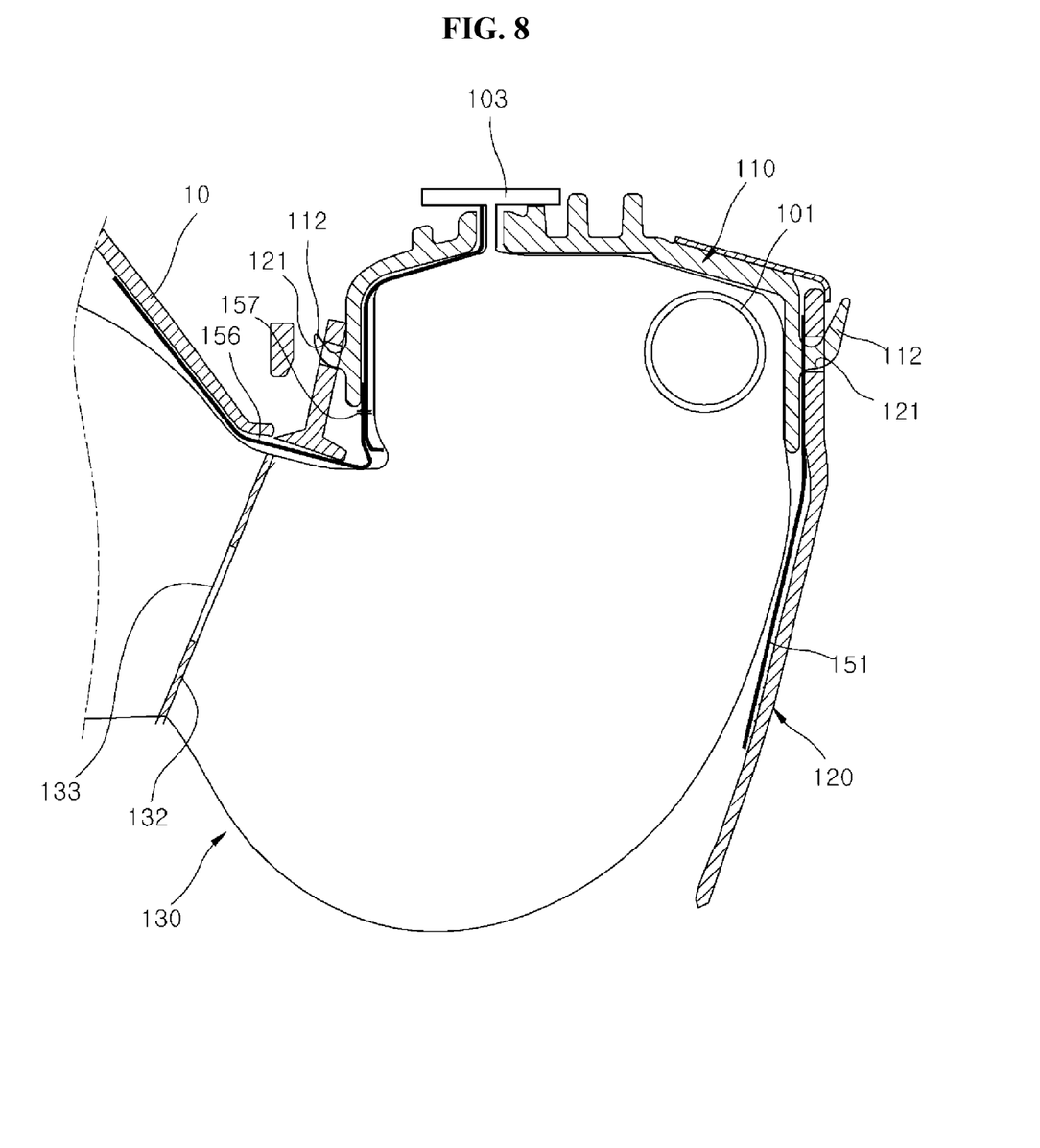
FIG. 8 is a sectional view illustrating a state in which the flap part blocks a gap between a lower panel and a housing part when the cushion part is deployed in the knee airbag apparatus in accordance with the second exemplary embodiment of the present invention.

FIG. 6 is a plan view illustrating a state in which a cushion part and a flap part are unfolded in the knee airbag apparatus in accordance with the second exemplary embodiment of the present invention. FIG. 7 is a sectional view illustrating the knee airbag apparatus in accordance with the second exemplary embodiment of the present invention. FIG. 8 is a sectional view illustrating a state in which the flap part blocks a gap between a lower panel and a housing part when the cushion part is deployed in the knee airbag apparatus in accordance with the second exemplary embodiment of the present invention.

Referring to FIG. 6 to FIG. 8, a flap part 150 is installed to surround the side of the folded cushion part 130 facing the cover part 120, and blocks a gap between the housing part 110 and the lower panel 10 to substantially prevent the cushion part 130 from being caught by the housing part 110 when the cushion part 130 is deployed.

In the flap part 150, a tear line 155 is formed on the deployment direction side (indoor space side) of the cushion part 130. In the flap part 150, since the tear line 155 is formed on the deployment direction side of the cushion part 130, a part of the flap part 150 is flipped to an opposite side of the indoor space together with the cover part 120 and the remaining part of the flap part 150 is flipped in the deployment direction of the cushion part 130, so that the flap part 150 blocks the gap between the lower end of the lower panel 10 and the housing part 110.

Accordingly, it is possible to substantially prevent the cushion part 130 from being caught by, or interfering with, the lower end of the lower panel 10 when the cushion part 130 is deployed, and to substantially prevent the deployment direction of the cushion part 130 from being distorted or the cushion part 130 from being incompletely deployed. Furthermore, the cushion part 130 is substantially prevented from being deployed inside the lower panel 10, which makes it possible to ensure the safety of a passenger.

The flap part 150 includes a first flap portion 151 and a second flap portion 156.

One side of the first flap portion 151 is connected to the cushion part 130 or the bracket part 103, the other side of the first flap portion 151 is locked to the hook portion 112 of the housing part 110, and the tear line 155 is formed on the deployment direction side of the cushion part 130.

The second flap portion 156 is disposed to overlap the first flap portion 151 and is fixed to the first flap portion 151 by a first sewing part 157 and a second sewing part 158. The second flap portion 156 may be disposed below the first flap portion 151.

The first sewing part 157 is formed at a position away from the tear line 155 in one direction and the second sewing part 158 is formed in the other direction from the tear line 155, that is, a direction opposite to the first sewing part 157. In the present embodiment, the first sewing part 157 is disposed closer to the lower panel 10 than the tear line 155, and the second sewing part 158 is disposed farther from the lower panel 10 than the tear line 155.

The first sewing part 157 fixes the first flap portion 151 and the second flap portion 156 to each other even when the cushion part 130 is inflated. The second sewing part 158 is torn when the cushion part 130 is inflated and separates the first flap portion 151 from the second flap portion 156.

That is, the first sewing part 157 serves to fix the second flap portion 156 to the first flap portion 151, and the second sewing part 158 serves to temporarily join them such that the second flap portion 156 is separated from the first flap portion 151 when the cushion part 130 is inflated.

The first flap portion 151 includes a first flap body 152 and a first locking portion 153. One side of the first flap body 152 is connected to the cushion part 130 or the bracket part 103, and the tear line 155 is formed on the deployment direction side of the cushion part 130.

The first locking portion 153 extends from the other side of the first flap body 152 so as to be locked to the hook portion 112. A plurality of first locking portions 153 may be formed on the other side of the first flap body 152.

Since a folding method of the cushion part 130 in the second exemplary embodiment is substantially the same as that of the first exemplary embodiment, a description thereof will be omitted.

An operation of the knee airbag apparatus in accordance with the second exemplary embodiment of the present invention configured as described above will be described below.

Figure 9A:
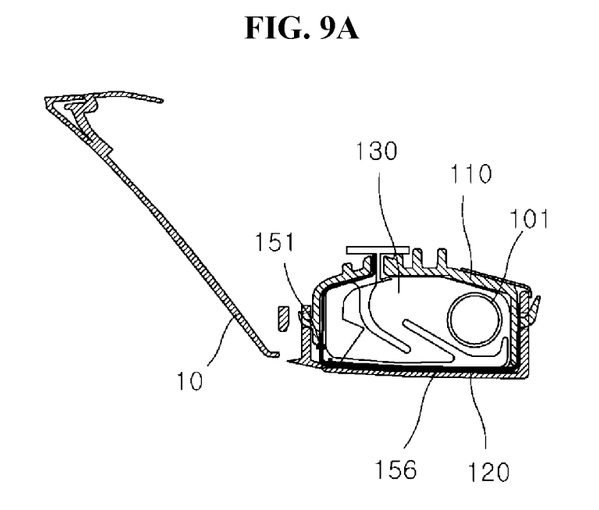
FIG. 9A, FIG. 9B, and FIG. 9C are views illustrating a process of deploying the cushion part in the knee airbag apparatus in accordance with the second exemplary embodiment of the present invention.
Figure 9B:
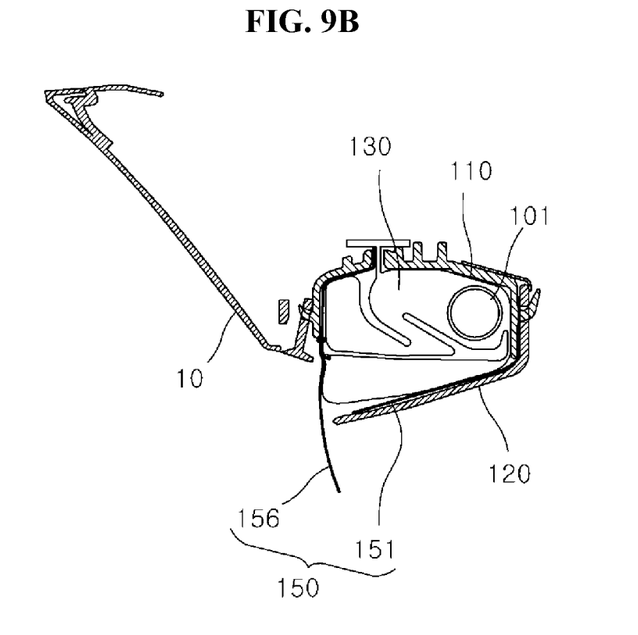
Figure 9C:
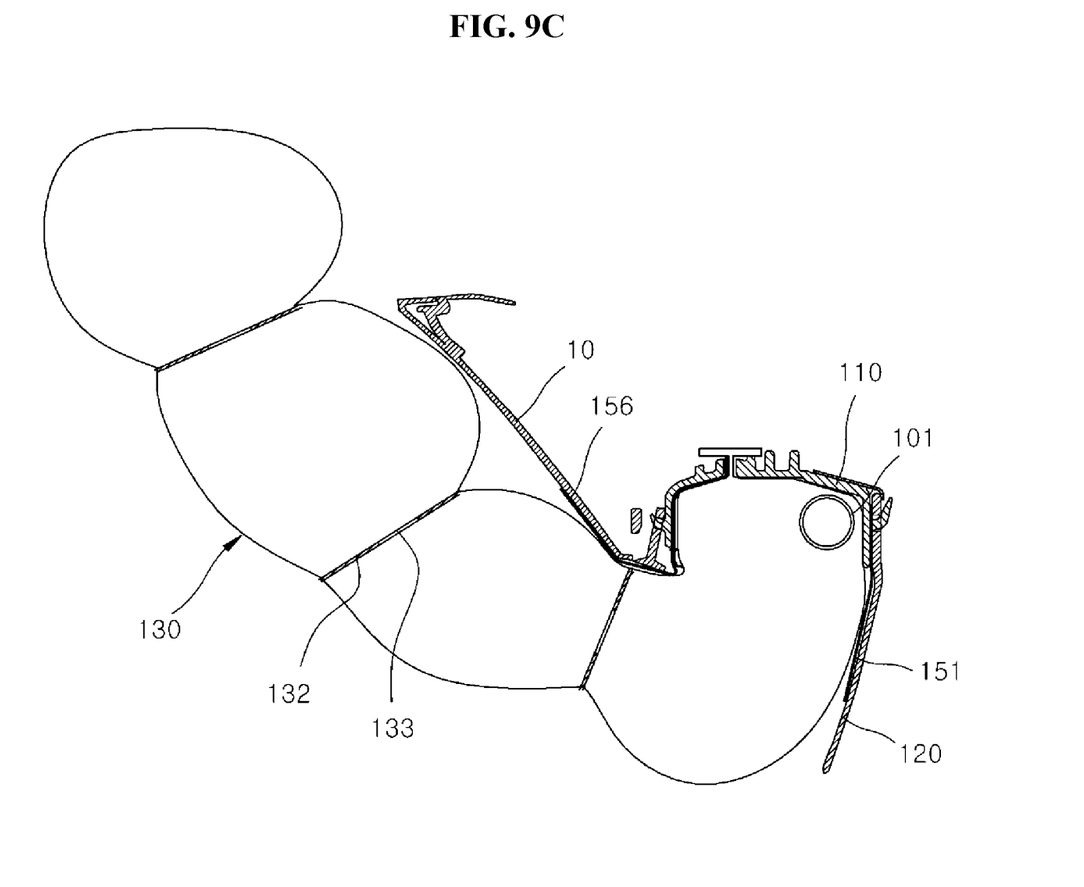

FIG. 9A to FIG. 9C are views illustrating a process of deploying the cushion part in the knee airbag apparatus in accordance with the second exemplary embodiment of the present invention.

Referring to FIG. 9A to FIG. 9C, when a collision of a vehicle is detected, the inflator 101 is driven. As gas generated in the inflator 101 is injected into the cushion part 130, the cushion part 130 is inflated. When the inflation pressure of the cushion part 130 is applied to the cover part 120, the cover cutoff part 123 of the cover part 120 is cut off, such that the cover part 120 is rotated toward the front side of the vehicle to open the lower side of the housing part 110.

Subsequently, when the inflation pressure of the cushion part 130 is applied to the flap part 150, the tear line 155 of the first flap portion 151 is torn by the inflation pressure of the cushion part 130. Furthermore, since the second sewing part 158, which temporarily joins the first flap portion 151 and the second flap portion 156, is torn, the first flap portion 151 and the second flap portion 156 are separated around the second sewing part 158. Even at this time, the first sewing part 157 still fixes the first flap portion 151 and the second flap portion 156.

At this time, since the tear line 155 is disposed on one side (indoor space side) of the first flap portion 151, the first flap portion 151 is flipped to the front side of the vehicle by the tearing of the tear line 155. At this time, the first flap portion 151 is flipped to the front side of the vehicle together with the cover part 120.

When the cushion part 130 is deployed to the indoor space side, the second flap portion 156 connected to the first flap portion 151 by the first sewing part 157 is flipped to the indoor space side to block the gap between the lower end of the lower panel 10 and the housing part 110. Meanwhile, a part of the first flap portion 151 separated by the tear line 155, that is, a part not connected to the second flap portion 156 is flipped together with the cover part 120.

Accordingly, it is possible to substantially prevent the cushion part 130 from being caught by or interfering with the lower end of the lower panel 10 when the cushion part 130 is deployed, and to substantially prevent the deployment direction of the cushion part 130 from being distorted or the cushion part 130 from being only partially deployed. Furthermore, the cushion part 130 is substantially prevented from being deployed inside the lower panel 10, which makes it possible to ensure the safety of the passenger.

According to the inventive concepts, when the cushion part is deployed, the flap part is flipped to block a gap between the housing part and the lower panel, which makes it possible to substantially prevent the cushion part from being caught by or interfering with a lower end of the lower panel.

Furthermore, according to the inventive concepts, the gap between the housing part and the lower panel is blocked by the flap part, which makes it possible to substantially prevent the cushion part from being deployed inside the lower panel.

Although the inventive concepts have been described with reference to the embodiments illustrated in the drawings, the exemplary embodiments of the present invention are for illustrative purposes only, and those skilled in the art will appreciate that various modifications and equivalent other embodiments are possible.

Thus, the true technical scope of the present invention should be defined by the following claims.

What is claimed is:

1. A knee airbag apparatus comprising:
a housing part having one side thereof open;
a cover part covering the open side of the housing part;
a cushion part that is accommodated in a folded state inside the housing part and connected to an inflator; and
a flap part surrounding the folded cushion part on a side of the cover part, and configured to block a gap between the housing part and a lower panel of a vehicle to substantially prevent the cushion part from being caught by the lower panel when the cushion part is deployed,
wherein:
the flap part includes a tear line that separates the flap part into a plurality of flap parts; and
the tear line is formed on the flap part to be biased in a direction away from the lower panel with respect to a center of the cover part.

2. A knee airbag apparatus comprising:
a housing part having one side thereof open;
a cover part covering the open side of the housing part;
a cushion part that is accommodated in a folded state inside the housing part and connected to an inflator; and
a flap part surrounding the folded cushion part on a side of the cover part, and configured to block a gap between the housing part and a lower panel of a vehicle to substantially prevent the cushion part from being caught by the lower panel when the cushion part is deployed,
wherein:
the flap part includes a tear line that separates the flap part into a plurality of flap parts; and
the tear line is formed on the flap part to be biased toward an opposite side in a deployment direction of the cushion part with respect to a center of the cover part.

3. The knee airbag apparatus according to claim 2, wherein:
one side of the flap part is connected to the cushion part or a bracket part; and
the other side of the flap part is locked to a hook portion of the housing part.

4. The knee airbag apparatus according to claim 3, wherein the flap part comprises:
a flap body connected to the bracket part or the cushion part and surrounding the folded cushion part; and
a locking portion extending from the other side of the flap body so as to be locked to the hook portion and is provided with the tear line.

5. The knee airbag apparatus according to claim 3, wherein:
the flap part is flipped to cover the bracket part;
an upper side of the cushion part is folded in a zigzag manner;
a lower side of the cushion part is roll-folded; and
both sides of the cushion part are folded in a zigzag manner.

6. A knee airbag apparatus comprising:
a housing part having one side thereof open;
a cover part covering the open side of the housing part;
a cushion part that is accommodated in a folded state inside the housing part and connected to an inflator; and
a flap part surrounding the folded cushion part on a side of the cover part, and configured to block a gap between the housing part and a lower panel of a vehicle to substantially prevent the cushion part from being caught by the lower panel when the cushion part is deployed,
wherein the flap part comprises:
a first flap portion surrounding the folded cushion part on the side of the cover part and provided with a tear line; and
a second flap portion overlapping the first flap portion.

7. The knee airbag apparatus according to claim 6, wherein the tear line separates the first flap portion into a plurality of first flap portions, and is formed on the first flap portion to be biased in a direction closer to the lower panel with respect to a center of the cover part.

8. The knee airbag apparatus according to claim 6, wherein the tear line separates the first flap portion into a plurality of first flap portions, and is formed on the first flap portion to be biased in a deployment direction of the cushion part with respect to a center of the cover part.

9. The knee airbag apparatus according to claim 8, wherein:
the first flap portion has one side connected to the cushion part or a bracket part and the other side locked to a hook portion of the housing part;
the second flap portion is connected to the first flap portion by a first sewing part and a second sewing part; and
the second sewing part is torn when the cushion part is inflated.

10. The knee airbag apparatus according to claim 9, wherein the first sewing part is formed at a point closer to the lower panel than the tear line, and the second sewing part is formed at a point farther from the lower panel than the tear line.

11. The knee airbag apparatus according to claim 10, wherein the first flap portion comprises:
a first flap body having one side connected to the cushion part or the bracket part and is provided with the tear line; and
a first locking portion extending from the other side of the first flap body so as to be locked to the hook portion.

* * * * *